United States Patent
Weber et al.

(10) Patent No.: US 11,441,677 B2
(45) Date of Patent: Sep. 13, 2022

(54) CONTROL ARRANGEMENT FOR VEHICLES HAVING A HYDROSTATIC AUXILIARY DRIVE

(75) Inventors: Jürgen Weber, Dresden (DE); Erik Lautner, Potsdam (DE); Thomas Neubert, Hirschstein (DE)

(73) Assignee: CNH BAUMASCHINEN GMBH, Berlin (DE)

(*) Notice: Subject to any disclaimer, the term of this patent is extended or adjusted under 35 U.S.C. 154(b) by 3231 days.

(21) Appl. No.: 12/996,765

(22) PCT Filed: Jun. 5, 2009

(86) PCT No.: PCT/EP2009/004028
§ 371 (c)(1),
(2), (4) Date: Mar. 26, 2012

(87) PCT Pub. No.: WO2009/146922
PCT Pub. Date: Dec. 10, 2009

(65) Prior Publication Data
US 2013/0013158 A1      Jan. 10, 2013

(30) Foreign Application Priority Data

Jun. 7, 2008   (DE) ..................... 10 2008 027 333.3

(51) Int. Cl.
*F16H 61/435*   (2010.01)
*B60K 17/356*   (2006.01)
(Continued)

(52) U.S. Cl.
CPC ......... *F16H 61/435* (2013.01); *B60K 17/356* (2013.01); *F16H 61/425* (2013.01); *B60K 7/0015* (2013.01)

(58) Field of Classification Search
CPC .... F16H 61/435; F16H 61/425; E02F 9/2253; B60K 17/356; B60K 7/0015
See application file for complete search history.

(56) References Cited

U.S. PATENT DOCUMENTS

| | | | | |
|---|---|---|---|---|
| 4,444,286 A | * | 4/1984 | Hawkins | ................ F16H 61/46 180/197 |
| 5,420,791 A | * | 5/1995 | Olson | ..................... F16H 61/46 701/1 |

(Continued)

FOREIGN PATENT DOCUMENTS

| | | |
|---|---|---|
| DE | 3842405 A1 | 6/1990 |
| DE | 4210251 C2 | 4/1995 |

(Continued)

OTHER PUBLICATIONS

International Search Report and Written Opinion for PCT Application No. PCT/EP2009/004028 dated Aug. 28, 2009 (6 pages).

*Primary Examiner* — Thomas E Lazo
(74) *Attorney, Agent, or Firm* — Patrick Sheldrake; Peter Zacharias

(57) ABSTRACT

The invention relates to a control arrangement for vehicles having a hydrostatic auxiliary drive for one or more axles, in particular for motor graders, having a drive engine, driven rear wheels coupled to the drive engine, further wheels which can be activated by associated hydraulic motors and can be operated by a hydraulic pump coupled to the drive engine and which has an adjustable feed volume, wherein each wheel is connected to a hydraulic motor without a clutch. The hydraulic pump and the hydraulic motors can be activated electrically and adjusted in a continuously variable fashion and the hydraulic pump is connected directly, without valves, to the hydraulic motors in parallel by hydraulic lines. The control device controls the respective displacement volume of the hydraulic motors only as a function of the rotational speed signals of the sensors.

7 Claims, 2 Drawing Sheets

Figure 1:
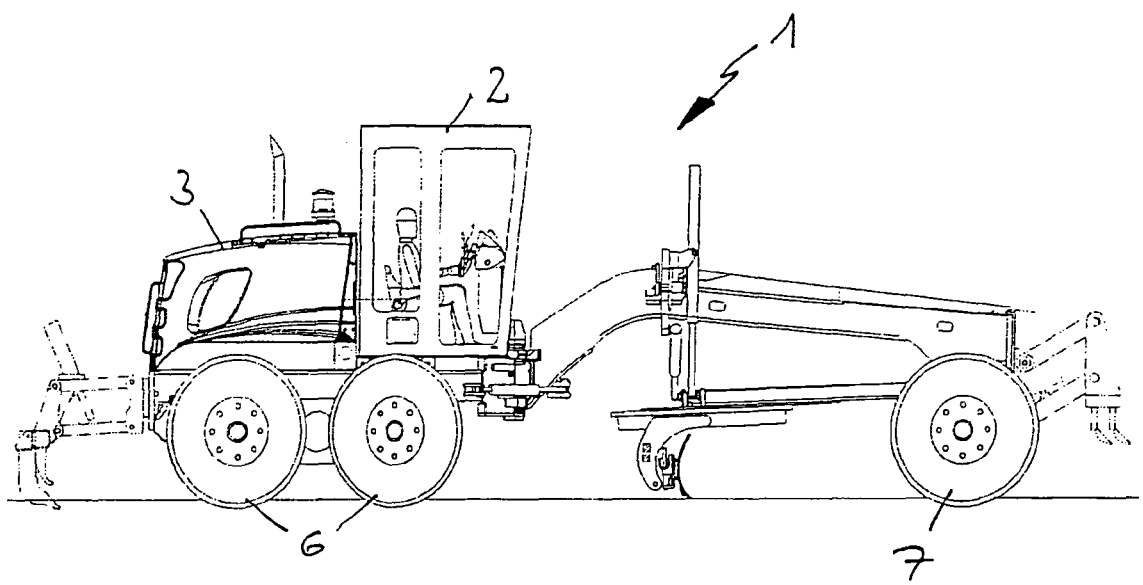

(51) Int. Cl.
 *F16H 61/425* (2010.01)
 *B60K 7/00* (2006.01)

(56) References Cited

U.S. PATENT DOCUMENTS

| | | | |
|---|---|---|---|
| 5,564,519 A | 10/1996 | Katoh et al. | |
| 6,164,402 A * | 12/2000 | Hastreiter | E02F 9/226 180/243 |
| 6,644,429 B2 * | 11/2003 | Evans | F16H 61/47 180/246 |
| 6,857,494 B2 * | 2/2005 | Kobayashi | B62D 9/002 180/242 |
| 7,549,498 B2 * | 6/2009 | Lunzman | B60K 23/08 180/242 |
| 2002/0100630 A1 * | 8/2002 | Evans | G03G 5/02 180/242 |
| 2006/0065465 A1 | 3/2006 | Lunzman et al. | |

FOREIGN PATENT DOCUMENTS

| | | |
|---|---|---|
| DE | 10101748 B4 | 1/2004 |
| DE | 202005016404 U1 | 3/2007 |
| JP | 63126132 U | 8/1988 |
| JP | 63258223 A | 10/1988 |
| JP | 02070049 U | 5/1990 |

\* cited by examiner

CONTROL ARRANGEMENT FOR VEHICLES HAVING A HYDROSTATIC AUXILIARY DRIVE

This application is the U.S. National Stage application filed under 35 U.S.C. 365 and claiming priority to International Application Serial No. PCT/EP2009/004028, which was filed Jun. 5, 2009, which claims priority to German Application DE 102008027333.3 filed Jun. 7, 2008, each of which is incorporated herein by reference in its entirety.

The invention relates to a control arrangement for vehicles having a hydrostatic auxiliary drive for one or more axles, in particular for motor graders.

Some mobile working machines, such as motor graders, are currently driven by a diesel engine, possible by other engines or motors in the future, and by a gearbox via the rear wheels. The gears used for such purposes may include powershift gears with torque converter or parallel clutches, gear units with continuously adjustable transmission with hydrostatic, mechanical or electric power transmission, or torque-dividing gear units with mechanical/hydrostatic or mechanical/electrical division.

In addition to this main drive to the rear axle, you may optionally use a hydraulic front wheel drive. This has, on the one hand, the advantage that it achieves a stabilization of this rather long construction of the machine during work missions, on the other hand you can transfer more traction to the ground under unfavourable ground conditions (sludge, snow or ice), thus increasing the traction force or efficiency of the machine.

A number of different drive systems are nowadays used for the hydraulic front wheel drive. They mainly differ in the number of hydraulic pumps (single-line or dual-line system) and by using hydraulic motors with or without wheel gearing (slow or high-speed engine).

The control system arrangement of DE 42 10 251 C2 is a single-circuit system using only one pump, the two hydraulic motors are arranged parallel. To prevent the unilateral slipping of one of the front wheels, a volume flow divider valve is used to achieve a defined, uniform distribution of the pump feed volume rate to both wheels. To reduce tightening during driving along curves there is a hydraulic connection with a nozzle between the two hydraulic motors. Major loss is generated by the use of a flow divider and nozzle.

A control system of such a configuration will be generally subjected to the condition that the additionally driven wheels must be synchronous to the main drive wheels (rear wheels), so that wheels of identical size rotate at an identical rotational speed. The control system arrangement according to DE 42 10 251 C2 is therefore characterized by the control device adjusting the feed volume for each rotation of the hydraulic adjustment pump by means of an actuator element (proportional solenoid valve) as a function of the rotational speed signals of the permanently driven rear wheels, and a further sensor being connected with the control equipment on the admission side to record the rotational speed of the drive motor, the control device defining the rotational speed of the hydraulic motors by adjusting the feed volume per rotation of the hydraulic adjusting pump as a function of the ratio of the rotational speed of the permanently driven rear wheels to the drive motor speed. This type of control arrangement has been basically well proven in practical applications, but has a number of disadvantages.

The known arrangement can only be connected or disconnected at standstill and this only with a high technical expense due to the constant volumetric flow rate of the radial piston motors. Moreover, it is only to a limited extent possible (maximum traction force) to adjust to operating conditions, especially in the higher speed range, as the radial piston motor volume flow rate cannot be adjusted continuously. The supply to the two radial piston motors arranged in parallel also bears an inherent risk of loss based on the principle due to the required volume divider valve. You furthermore have to take into account, as a function of the principle, a rotational speed deviation due to the unequal pressure losses in the measuring orifice of the volume flow divider valve if you use electronic synchro control. Furthermore, the volume flow divider valve will try to maintain the synchronous run, which results in the wheels tightening and affects the quality of the working process during steering (wheel steering and/or articulated steering). Finally, the system will have to be subjected to high manual work for system calibration both during manufacturing and servicing work. Such calibration is necessary to properly adjust the pump volume flow rate to the machine speed, also taking into account the load condition and ambient temperatures.

In addition to the single-circuit system in application today, you will find mainly double-circuit systems in application, which means that each wheel motor makes use of a drive pump and a separate hydraulic circuit. The synchronous run of the wheels must be ensured by an appropriate control system for both pumps. During steering, the two wheels need different volume flow rates, otherwise there is a risk of tightening and negative affect to the working results. When driving through curves, it is therefore absolutely necessary for the recording of the steering angle to adjust both pumps to the different volume flow rate required for the two wheels.

From US 2006/0065465 A1, U.S. Pat. Nos. 5,420,791 A and 6,644,429 B2 we know high-speed axial piston motors with one planetary gear unit each and a 2-pump concept, which will require a clutch between wheel gearing and hydromotors. Based on the axial piston motors which are switched by steps and which have a minimum displacement volume greater than Zero, you will need two clutches between hydromotors and wheels to ensure that there is idle run (for switching off and on) and certain safety requirements, and that means extremely high technical expense, low reliability due to wear and tear, and higher energy losses. These approaches are subject to high technical expense and high costs due to two separate pumps which are both provided with the additional elements required. Moreover, the result is a high general control expense by the individual control of the two hydraulic pumps. For curve travel, you will furthermore need much control work as the volume flow rate must be individually divided between the two hydraulic motors, as otherwise both wheels are liable to tighten against each other.

From DE 101 01 748 B4 we know a hydrostatic travel drive for a hydrostatically driven vehicle, and a procedure for traction enhancement. In this travel drive, the axles are separately driven by one hydraulic motor each. Both hydraulic motors are adjustable and are in parallel supplied from an adjusting pump. Both axles are equally handled on the control level. No axle will have any priority. But with the motor grader, the rear axle is the "master". It is the essential task of a control system for the front axle to adjust the front wheels to the rear wheels, i.e. the front wheels would not be able to move the machine on their own during regular operating mode, in which the front wheel drive is connected. The control system in patent DE 101 01 748 B4 has the purpose to monitor the tractions occurring on both front and rear wheels, and to control the hydraulic motors so that no axle may slip or that the traction on the axles is reached again respectively. It therefore makes use of torque sensors integrated into the axles and pressure sensors integrated into the main circuit. All information is transmitted to an electronic control device which controls both the hydraulic pump and hydraulic motors as a function of the driving requirements and traction conditions. This well-known solution does not relate to any control arrangement of this type for vehicles with an auxiliary hydrostatic drive and a main drive motor, but purely hydrostatically driven vehicles.

From U.S. Pat. No. 4,444,286 A we know of a control arrangement for vehicles with an auxiliary hydrostatic drive, particularly for a motor grader, wherein a single hydraulic motor is provided for the auxiliary drive, and wherein this single hydraulic motor drives both wheels of the auxiliary drive. Such a drive configuration with only one hydraulic motor cannot be compared with a drive configuration which has one hydraulic pump with hydraulic motors installed parallel from a technical point of view, the result being that this patent does not disclose a control arrangement of this type.

From U.S. Pat. No. 5,564,519 A we know a control arrangement for vehicles with a hydrostatic auxiliary drive in which the auxiliary drive is provided with a hydraulic pump coupled with the drive motor and two hydraulic motors. Each hydraulic motor is connected by a clutch to the wheel to which it is allocated. The essential characteristic of this type of control arrangement is the clutch between the respective hydraulic motor and the wheel which it drives. It is also of substantial importance that the pressure conditions inside the system are detected with pressure sensors, and the control device has an effect depending on the pressure signals. These requirements result in the known control arrangement becoming highly expensive.

It is the goal of the invention to enhance a control arrangement which meets the requirements of the type so that it is possible to improve the control system of the hydrostatic auxiliary drive at substantially lower expense.

The particular purpose is to reduce the technical expenditure and costs and the expenditure for components and the control system, to achieve maximum energy efficiency, and to remove any technical limitations during the work process, including the tightening effects between the two wheels driven by the auxiliary drive, and moreover to enable its connection or disconnection when in motion.

This requirement is met by a control arrangement of the invention of the above type and according to the invention by providing both the hydraulic pump and the hydraulic motors with an electrical control and continuous adjustment system, and by connecting the hydraulic pump via hydraulic lines in parallel and without valve directly to the hydraulic motors; each hydraulic motor being allocated a rotary sensor whose rotational speed signals are transmitted to the control system, and the control unit controlling the respective displacement volume of the hydraulic motors as an exclusive function of the speed signals received from the sensors.

The control arrangement of the invention fully dispenses with valves or flow rate dividers and is not subjected to energy losses resulting from them. This principle has the benefit of both hydraulic motors being connected with the hydraulic pump using a T-shaped piece, so to speak. The different volume flow rate required for each of the two hydraulic motors is self-compensating without any additional measures. This is especially true in the event of a curve travel, the volume flow rate being automatically divided to a different extent to either hydraulic motor of the wheel located inside the curve and the one outside. The additional drive can be connected or disconnected at any moment, even during the travel proper, without any additional components such as hydraulic valves or clutches, in a cost-saving manner. Existing traction reserves can be used to the optimum by the infinitely variable adjustment of the displacement volume of the hydraulic motors. The synchronous run of the two hydraulic motors arranged parallel is performed in a simple, cost-efficient way without throttling losses due to a flow rate divider valve on the basis of its principle. Differences of speed during synchronous operation which are based on the principle are avoided by dispensing with a flow rate divider valve, the working performance no longer being affected by such differences. The parallel arrangement of the hydraulic motors prevents tightening during steering, which may be caused by a flow rate divider valve, thus contributing to a substantial improvement of the working process. You can minimize the expense arising during manufacturing and service, by using an automatic calibration process to adjust the pump volume flow rate.

The control arrangement of the invention has a very simple design without clutches and without the necessity of pressure sensors. Only the pump volume and the motor volumes are used as control elements. The control unit is only based on the evaluation of the rotational speed signals and, if a gearbox is arranged between the drive motor and the driven rear wheels, of the gearbox and the chosen gear respectively, and this under any conditions of use.

The fact that the hydropump is fixed to the drive motor and front wheels results in a disconnection of the drive system by continuously adjusting the displacement volume of pumps and motors to Zero. The drive system is connected in the same way by continuously increasing the displacement volume of pumps and motors starting from Zero. By adjusting the timing of the actuator ramps, pressure peaks are eliminated which would have a negative impact on the working process and could result in damage to the components.

In a most preferred embodiment there is a possibility to connect and disconnect the hydrostatic auxiliary drive by way of the electronic control system. You can do so anytime when in motion. Therefore, no other components, hydraulic valves and/or clutches are needed.

In a most preferred embodiment, the hydraulic pump is designed as an axial piston pump of the swash plate or sloping axle type, and the hydraulic motors as axial piston motors of the swash plate or sloping axle type, which can be adjusted to Zero.

Another preferred embodiment provides that the respective hydraulic motor is linked to the allocated wheel via a gear transmission, particularly a planetary gear unit.

To achieve the required traction if required, another provision is made to enable the control system to detect and control the volume flow rate of the hydraulic pump as a function of the rotational speed of the rear wheels and a low portion of speed which can additionally be manually adjusted or preselected.

The invention furthermore provides in another embodiment that the displacement volumes of the hydraulic motors can be differently set to adjust to varying ground conditions. A targeted individual influence on the displacement volumes of both hydraulic motors and/or the hydraulic pump will ensure the optimum distribution of traction forces on both of the front wheels for varying ground conditions. The slip of either of the front wheels is prevented efficiently, while the traction force to the other is maintained. This also works if both wheels threaten to slip.

If the driving speed of the working machine is high, there is an adjustment of the currently required volume rate of the hydraulic motors to the maximum volume flow rate of the hydraulic pump by adjusting the displacement volume of the hydraulic motors.

The main drive of the rear wheels of the working machine works via a gear unit (such as powershift gears with torque converter or parallel clutches, gear units with continuously adjustable transmission with hydrostatic, mechanical or electric power transmission, or torque-dividing gear units with mechanical/hydrostatic or mechanical/electrical division). In addition to the rear wheel speed, the control device detects the drive motor speed (particularly diesel engines) and determines the currently required displacement volume of the hydraulic pump as a function of the chosen gear.

The operator of the working machine may even select an operating mode for the control arrangement, which results in the main drive switching to neutral and the working machine being exclusively driven by the front wheels by a merely hydrostatic action.

If the auxiliary drive is disconnected, the hydraulic pump and the hydraulic motors rotate along with the motor speed of the drive motor or the wheel gear torque respectively without pressure and volume flow rate.

Figure 2:
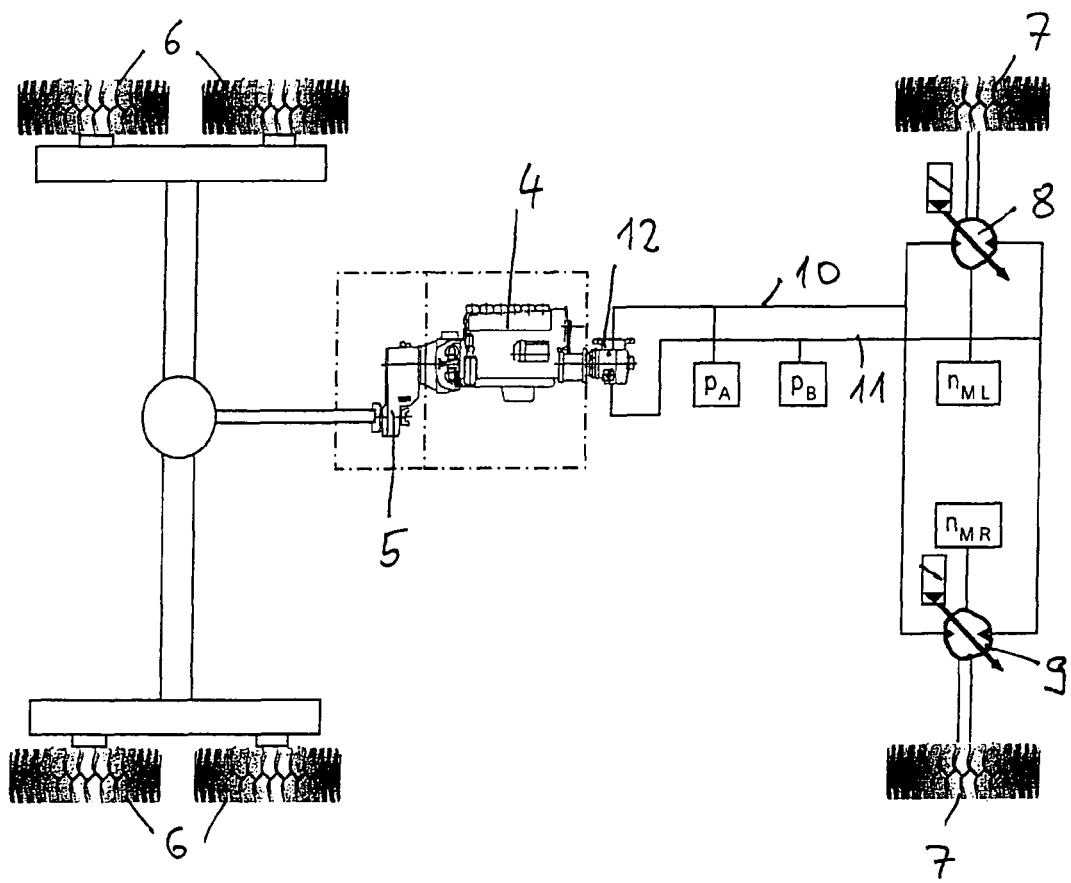
Figure 3:
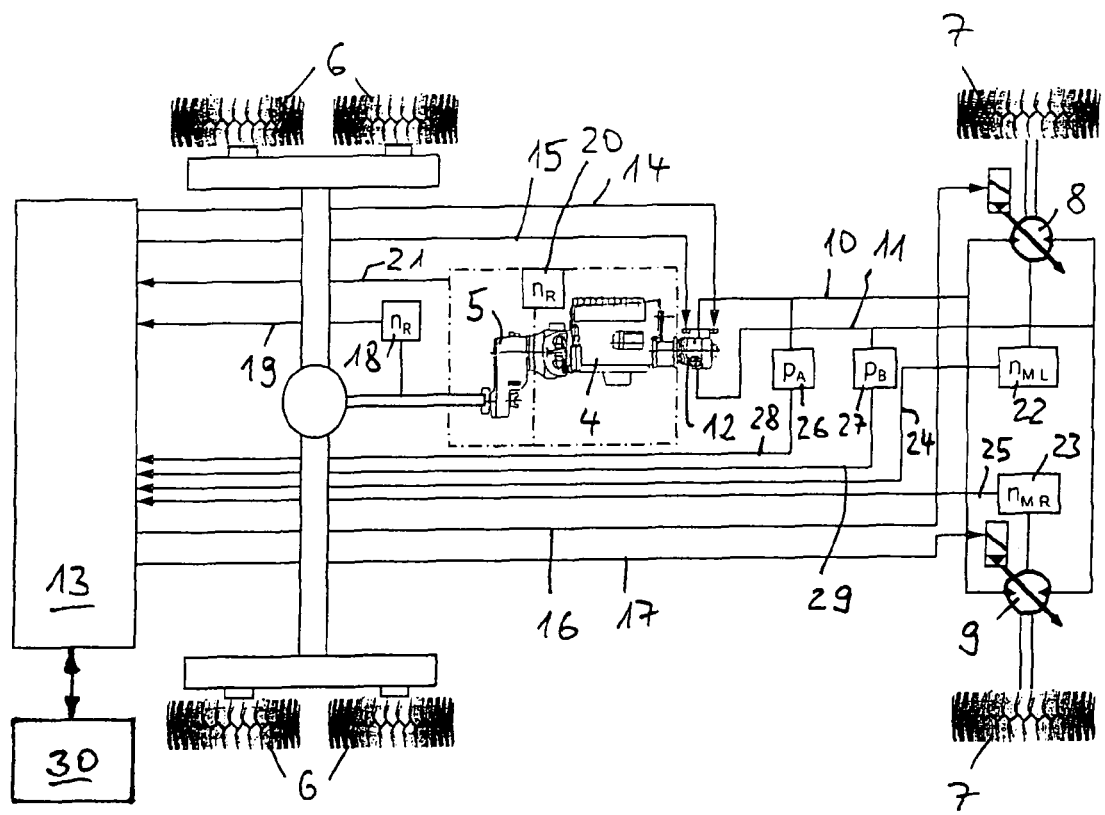

The following drawing is illustrative of the present invention and is not to be construed as limiting. It shows in FIG. 1 a schematic side view of a motor grader, FIG. 2 a simplified block diagram of the control arrangement of the invention, and in FIG. 3 the block diagram according to FIG. 2 with the signal structure.

The control arrangement of the invention is described in the following by the example of its integration into a motor grader, but is not limited to such a working machine. Such a grader is generally referred to as 1 in FIG. 1.

This motor grader 1 has a housing 3 behind a driver's cabin 2 which incorporates a drive motor 4 (FIG. 2), preferably a diesel engine, which is connected to a shift transmission 5 which is at least linked to two rear wheels 6 via a main drive train so that the rear wheels 6 are driven by the drive motor 4 via the gear unit 5.

Another embodiment has a total of four rear wheels 6 which are arranged on a tandem axle.

In addition to this drive motor 4 which permanently drives the rear wheels 3 in general, the control arrangement of the motor grader 1 has another hydrostatic auxiliary drive for front wheels 7 which can be connected. Each front wheel 7 has its own allocated hydraulic motor 8, 9 in this embodiment. Both hydraulic motors 8, 9 can be electrically controlled and are continuously adjustable, in a preferred version they are designed as axial piston motors of the swash plate type. In this version, a gearbox, which is not included in the drawing, such as a planetary gear unit, will be arranged in a preferred version between the hydraulic motor 8 or 9 respectively and the front wheel 7.

Both hydraulic motors 8, 9 are connected in parallel and without valve directly to a hydraulic motor 12 with hydraulic lines 10, 11, the pump also being controlled electrically and continuously adjustable and of a preferred design as an axial piston pump of the swash plate type. This hydraulic pump 12 is coupled to the drive motor 4.

A substantial element of the control arrangement is an electronic control unit 13 (FIG. 3), which is connected to the hydraulic pump 12 via pump control lines 14, 15 and to the hydraulic motors 8, 9 via control lines 16, 17.

The control arrangement furthermore has several rotary sensors, including a sensor 18 for detecting the rotational speed of rear wheels 6, which is connected to the electronic control unit 13 via a signal line 19. Another element is a rotational speed sensor 20 which is connected to the electronic control unit 13 via a signal line 21, to detect the speed of drive motor 4.

Another element are the rotational speed sensors 22, 23 each of which is allocated to the hydraulic motors 8, 9 respectively and are connected to the electronic control unit 13 via a signal line 24 and 25 respectively. Finally, there are the pressure sensors 26, 27 in the hydraulic lines 10 and 11 respectively, which are connected to the electronic control unit 13 via a signal line 28 and 29 respectively. These pressure sensors 26, 27 are exclusively used for calibration purposes.

It is clearly visible that the hydrostatic auxiliary drive (hydraulic pump 12, hydraulic motors 7, 8 and hydraulic lines 10, 11) has no other components, such as valves, throttles or similar devices, so that the control arrangement may be connected or disconnected any time, even when the motor grader 1 is in motion, without the help of auxiliary components, hydraulic valves, clutches or similar devices. If the auxiliary drive is disconnected, the hydraulic pump 12 and the hydraulic motors 8, 9 rotate along with the rotational speed of the drive motor 4 or of the shift transmission 5 respectively without pressure and volume flow rate.

The driver may connect or disconnect the hydrostatic auxiliary drive by operating a control unit 30 which is connected to the control unit 13. The control system 13 will hereby continuously increase the displacement volumes of the hydraulic pump 12 and of the hydraulic motors 8, 9 starting from Zero to the calculated value, continuously decreasing these volumes back to Zero upon disconnection.

The driver may furthermore change the traction at the front wheels 7 in relation to the rear wheels 6 using the control unit 30. The control unit 13 converts this adjusting signal to an additional displacement volume of hydraulic pump 12, and this will result in an additional rotational speed of the front wheels 7. This additional rotational speed may exceed the value of the rear wheels 6 by 30% in extreme cases.

In order to determine the volume flow of hydraulic pump 12, the sensor 18 initiates a measurement of the rotational speed of rear wheels 6 in such a way that the front wheels 7 will follow the speed of rear wheels 6, preferably adding a small amount of an additional rotational speed which can be adjusted manually if an additional traction is desired.

If the driving speed of the motor grader 1 is high, there is preferably an adjustment of the currently required volume rate of the hydraulic motors 8, 9 to the maximum volume flow rate of the hydraulic pump 12 by adjusting the displacement volume of the hydraulic motors 8, 9.

The main drive of the rear wheels of the motor grader 1 works via the gear unit 5 (such as powershift gears with torque converter or parallel clutches, gear units with continuously adjustable transmission with hydrostatic, mechanical or electric power transmission, or torque-dividing gear units with mechanical/hydrostatic or mechanical/electrical division). In addition to the rotational speed of the rear wheels 6 via sensor 18, the electronic control unit 13 also detects the rotational speed of the drive motor 4 via sensor 20, calculating the currently necessary displacement volume of hydraulic pump 12 independently of the selected gear.

A dedicated influence on the displacement volumes of both hydraulic motors 8, 9 will ensure the optimum distribution of traction forces on both front wheels 7 for varying ground conditions. The slip of either of the front wheels 7 is prevented efficiently, while the traction force to the other front wheel 7 is maintained.

The operator of the working machine, i.e. the motor grader 1, may select an operating mode, in which the main drive (shift transmission 5) is switched to neutral and the motor grader 1 is exclusively driven by the front wheels 7 by a merely hydrostatic action.

The invention claimed is:

1. A control arrangement for vehicles having a hydrostatic auxiliary drive for one or more axles, comprising
    a drive motor;
    driven rear wheels coupled to the drive motor;
    further wheels, connectable via allocated hydraulic motors and which are activated by a hydraulic pump coupled with the drive motor and has an adjustable feed volume, wherein each wheel is connected to a hydraulic motor without a clutch;
    a sensor to detect the rotational speed of the rear wheels and a sensor to detect the rotational speed of the drive motor;
        an electronic control device configured to receive the rotational speed signals of the rear wheels and the drive motor and which controls the hydraulic motors as a function of the rotational speed; and
        wherein the hydraulic pump and hydraulic motors are activated electrically and are continuously variable and the hydraulic pump is connected directly, without valves, to the hydraulic motors in parallel by hydraulic lines, wherein each hydraulic motor has an allocated rotational speed sensor whose respective speed signals are received by the control device, and wherein the control device controls the respective displacement volume of the hydraulic motors only as a function of the rotational speed signals from the sensors.

2. A control arrangement in accordance with claim 1, wherein the electronic control device is configured to connect or disconnect the hydrostatic auxiliary drive in any given operating condition.

3. A control arrangement in accordance with claim 1, wherein
    the hydraulic pump is designed either as an axial piston pump of the swash plate or sloping axle type.

4. A control arrangement in accordance with claim 1, wherein
    the hydraulic motors are designed either as axial piston motors of the swash plate or sloping axle type.

5. A control arrangement in accordance with claim 1, wherein the respective hydraulic motor is connected to the allocated wheel by a gear unit.

6. A control arrangement in accordance with claim 1, wherein the control device is configured to determine and control the volume flow rate of the hydraulic pump as a function of the rotational speed of the rear wheels and a low portion of speed which can additionally be manually adjusted or pre-defined.

7. A control arrangement in accordance with claim 1, wherein the displacement volumes of the hydraulic motors and/or the hydraulic pump can be adjusted so as to account for different ground conditions.

* * * * *